(12) United States Patent
Allen et al.

(10) Patent No.: US 8,446,247 B2
(45) Date of Patent: May 21, 2013

(54) SAFETY SYSTEM

(75) Inventors: Robert M. Allen, Greenacres, WA (US); Michael Harrington, Spokane, WA (US); Lynn E. Vershum, Coeur d' Alene, ID (US)

(73) Assignee: J&L Group International, LLC, Keithville, LA (US)

( * ) Notice: Subject to any disclaimer, the term of this patent is extended or adjusted under 35 U.S.C. 154(b) by 510 days.

(21) Appl. No.: 12/603,351

(22) Filed: Oct. 21, 2009

(65) Prior Publication Data

US 2011/0090040 A1    Apr. 21, 2011

(51) Int. Cl.
*G05B 23/02* (2006.01)
*G01B 11/14* (2006.01)

(52) U.S. Cl.
USPC ............ 340/3.1; 356/614; 356/621; 356/622; 356/625; 356/630

(58) Field of Classification Search
USPC .................. 340/3.1; 356/614, 621, 622, 625, 356/630, 632–640
See application file for complete search history.

(56) References Cited

U.S. PATENT DOCUMENTS

| | | | |
|---|---|---|---|
| 3,841,766 A | 10/1974 | Walter | |
| 4,063,643 A * | 12/1977 | Wickstead | 209/531 |
| 4,107,522 A | 8/1978 | Walter | |
| 4,120,403 A * | 10/1978 | Stephanos | 209/564 |
| 4,843,230 A * | 6/1989 | Schmid et al. | 250/223 B |
| 5,039,081 A | 8/1991 | Shill | |
| 5,044,874 A | 9/1991 | Shill | |
| 5,095,684 A * | 3/1992 | Walker et al. | 53/443 |
| 5,205,703 A | 4/1993 | Shill et al. | |
| 5,218,196 A | 6/1993 | Dogul et al. | |
| 5,239,182 A * | 8/1993 | Tateyama et al. | 250/559.37 |
| 5,358,372 A | 10/1994 | Meredith | |
| 5,423,657 A | 6/1995 | Frost et al. | |
| 5,434,428 A * | 7/1995 | Paladini | 250/559.24 |
| 5,532,692 A * | 7/1996 | Tatsuya | 340/10.1 |
| 5,785,181 A * | 7/1998 | Quartararo, Jr. | 209/3.3 |
| 6,297,844 B1 | 10/2001 | Schatz et al. | |
| 6,595,740 B1 | 7/2003 | Drake et al. | |
| 6,979,814 B2 * | 12/2005 | Kudo et al. | 250/221 |
| 7,116,799 B2 * | 10/2006 | Wustefeld et al. | 382/103 |
| 7,187,457 B2 * | 3/2007 | Kobayashi | 356/639 |
| 8,087,218 B2 * | 1/2012 | Harding | 53/503 |
| 2003/0171895 A1 * | 9/2003 | Harris et al. | 702/183 |
| 2004/0075847 A1 * | 4/2004 | McCracken | 356/622 |
| 2006/0106487 A1 | 5/2006 | Allen et al. | |
| 2007/0147874 A1 | 6/2007 | Baker | |
| 2007/0205083 A1 * | 9/2007 | Smalley et al. | 198/412 |
| 2008/0136598 A1 * | 6/2008 | Chen et al. | 340/10.1 |
| 2009/0028686 A1 | 1/2009 | Tallis et al. | |
| 2009/0115122 A1 | 5/2009 | Roth et al. | |

* cited by examiner

*Primary Examiner* — Daniel Wu
*Assistant Examiner* — Kam Ma
(74) *Attorney, Agent, or Firm* — Dorsey & Whitney LLP; Kenneth E. Levitt, Esq.

(57) ABSTRACT

A safety system for detecting the presence of an undesired object in a safety area may include a first pair of distance measuring sensors disposed on opposed sides of the conveying path, the pair of distance measuring sensors defining a sensor field between said pair of distance measuring sensors, and an electronic control device operatively coupled to the sensors. The electronic control device may be configured to initiate a machine-stopping sequence based at least in part on signals received from the distance measuring sensors.

20 Claims, 8 Drawing Sheets

A: $(40_{UL} = 40_{DL}$ or $40_{UR} = 40_{DR})$ and $((40_{UL}, 40_{UR}$ or $40_{DL}, 40_{DR}) \leq T_h)$ B: $(40_{UL} = 40_{DL}$ or $40_{UR} = 40_{DR})$ and $((40_{UL}, 40_{UR}$ or $40_{DL}, 40_{DR}) \leq T_h)$ C: $(40_{UL} = 40_{DL}$ or $40_{UR} = 40_{DR})$ and $((40_{UL}, 40_{UR}$ or $40_{DL}, 40_{DR}) \neq T_a$ +/- tolerance$)$ D: $(40_{UL} = 40_{DL}$ or $40_{UR} = 40_{DR})$ and $((40_{UL}, 40_{UR}$ or $40_{DL}, 40_{DR}) \neq T_a$ +/- tolerance$)$

FIG. 13A

SAFETY SYSTEM

FIELD OF USE

The present disclosure relates to safety detection systems and related components which, upon the occurrence of specified events, generate output control signals. More particularly, the present disclosure relates to a system of interrelated electrical, optical, and/or mechanical components configured to sense the intrusion of an undesired object into a controlled space and upon such sensing to initiate a machine-stopping sequence.

BACKGROUND

Industrial safety requires protection of operators, maintenance personnel, and bystanders from potential injuries from hazardous machinery or materials. In many cases, the hazards can be reduced by automatically sounding an alarm or shutting off a process when dangerous circumstances are sensed, such as by detection of an operator approaching or entering an area proximate the hazardous machinery or materials.

In some instances, industrial safety is required in such areas, hereinafter referred to as safety areas, where materials and/or products are continuously or periodically transported, such as on conveyors. To provide safety in such instances, various types of systems are known for distinguishing between the presence of such conveyed materials and operators, which employ vertical and/or horizontal light curtains. In such systems, generally, upon detection of materials moving through the safety area, the light curtains are muted.

Such known systems suffer numerous drawbacks which compromise the safety and/or reliability of the systems. For example, if an undesired object, such as an operator, enters a safety area along side entering materials as the light curtain is muted, the system may not detect the presence of the undesired object. As a result, an operator may enter into the hazardous area without triggering an alarm or equipment shut down.

SUMMARY

A safety system for detecting the presence of an undesired object in a safety area is provided. The safety area may have a conveying path extending through said safety area for conveying materials. The safety system may comprise a first pair of distance measuring sensors disposed on opposed sides of the conveying path, the pair of distance measuring sensors defining a sensor field between the pair of distance measuring sensors, and an electronic control device operatively coupled to the sensors. The distance measuring sensors may be configured to transmit signals related to measured distances to the electronic control device. The electronic control device may be provided with programming instructions for calculating the thickness of objects disposed in the sensor field based at least in part on the signals received from the distance measuring sensors. The electronic control device may be configured to initiate a machine-stopping sequence based at least in part on the calculated thicknesses.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In some embodiments, the present disclosure may relate to safety systems and methods. Generally, the systems and methods may include a processing device and two or more distance measuring sensors provided in a safety area through which products and/or materials are continuously or periodically transported, and reliably determine whether an undesired object, such as a human, has entered the safety area. Particularly, the distances measured by the distance measuring sensors may be communicated to the processing device, which, based on the communicated distances, may determine whether any variations in the measured distances are a result of an operator entering the safety area.

Figure 1:
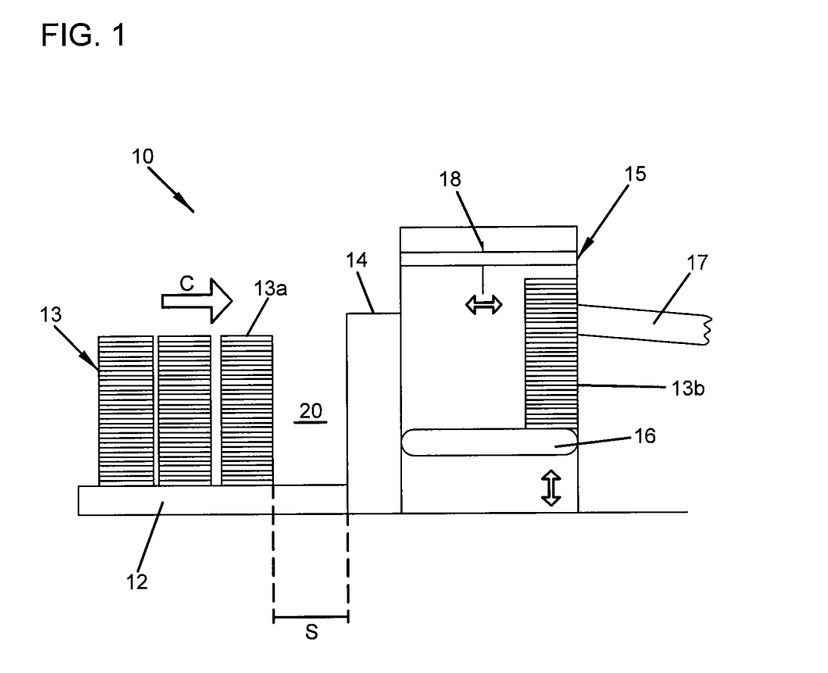
FIG. 1 depicts a schematic side view of a example system environment for operating the systems and methods of the present disclosure.

FIG. 1 is a schematic side view of a example system environment 10 for operating the systems and methods of the present disclosure. The system environment 10 may include a conveyor 12 used to transport large stacks of sheets 13 in a conveying direction C. The sheets may be any stock material that is provided in flat sheets, such as paper, paperboard cardboard, corrugated cardboard, and the like. The stacks of sheets 13 may be conveyed through an entrance 14 of a feeding apparatus 15 and onto a lift platform 16 of the feeding apparatus. The lift platform 16 may be raised to lift a desired portion of a stack 13b above a conveyor 17, such that a pusher 18 may be extended to push off a portion of the stack 13b extending above the conveyor 17 onto the conveyor 17 as a smaller stack of sheets. In operation, the stacks 13 may wait at the entrance 14 of the feeder, and be indexed one-by-one into the feeder 15 and onto the lift platform 16. A region 20, hereinafter referred to as a safety area, may be defined by an area which is proximate hazardous machinery and or materials, such as the feeding apparatus 15, and extends a predetermined distance S from the hazardous machinery or materials. As shown in FIG. 1, the area that extends a predetermined S from the entrance 14 of the feeder 15 may define the safety area 20. The predetermined distance S, hereinafter referred to as the safe distance, may be determined, for example, based on an appropriate industrial safety standard. Hazards associated with operation of the feeding apparatus 15 may include, for example, risk of injury of to an operator located underneath the lift 16.

While present disclosure is described with respect to embodiments in which the safety systems and methods are employed in conjunction with operation of a conveyor for transporting stacks of stock material into a feeding apparatus, it is to be appreciated that the systems and methods disclosed herein may be employed in any system environment where any type of materials, stacked or unstacked, are transported along a conveying path provided in a safety area (i.e., an area proximate to hazardous machinery or materials)

Figure 2:
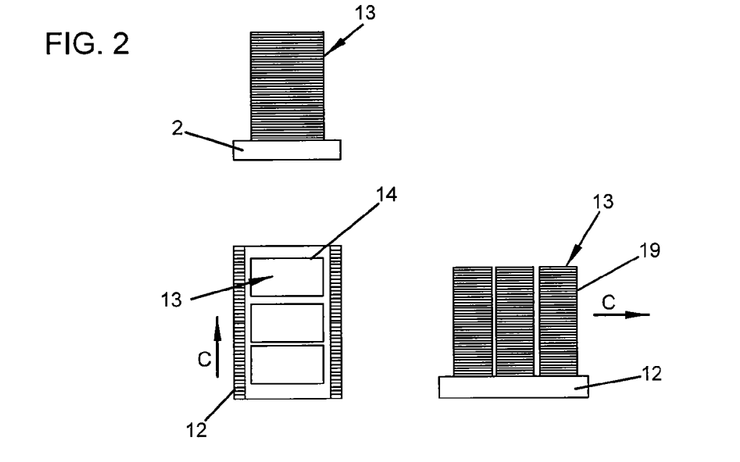
FIG. 2 depicts schematic top, front, and side views of three stacks oriented in an ideal fashion being transported on a conveyor.
Figure 3:
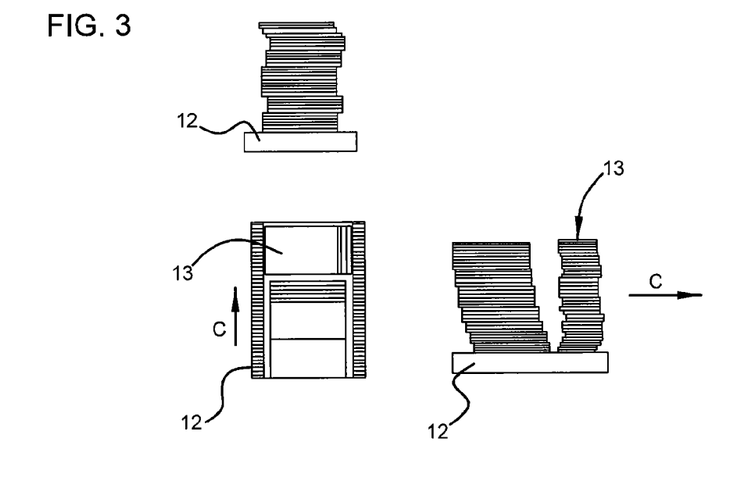
FIG. 3 depicts schematic top, front, and side views of three stacks oriented in a non-ideal fashion being transported on a conveyor.
Figure 4:
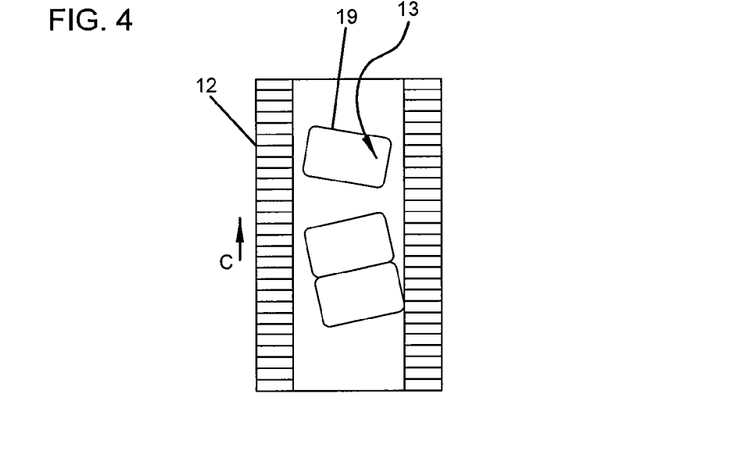
FIG. 4 depicts a schematic top view of a stack oriented in a non-ideal fashion being transported on a conveyor.

FIG. 2 depicts schematic top, front, and side views of three stacks 13 oriented in an ideal fashion being transported on a conveyor 12. Generally, ideally oriented stacks may refer to stacks oriented such that none of the sheets of the stack are offset relative to each other (i.e., the dimensions of the stack correspond to the dimensions of the sheets) and such that the leading edge 19 of the stacks are oriented substantially perpendicular relative to the conveying direction C. FIG. 3 depicts schematic top, front, and side views of three stacks 13 oriented in a non-ideal fashion being transported on a conveyor 12. FIG. 4 depicts a schematic top view of three stacks 13 oriented in a non-ideal fashion being transported on a conveyor 12. Generally, non-ideally oriented stacks may refer to stacks oriented such that an individual sheet or a group of sheets are offset relative to other sheets of the stack in directions parallel to the conveying direction C (i.e., offset to the front or back), in a direction perpendicular to the conveying direction C (i.e., offset to the left or right), or rotationally offset relative to the conveying direction C (i.e., the leading edge 19 is oriented obliquely with respect to the conveying direction). In some embodiments, the systems and method of the present disclosure may be configured to reliably detect the presence of undesired objects, such as human operators, in a safety area having stacks conveyed therein, notwithstanding the stacks being oriented in a non-ideal fashion.

Figure 5:
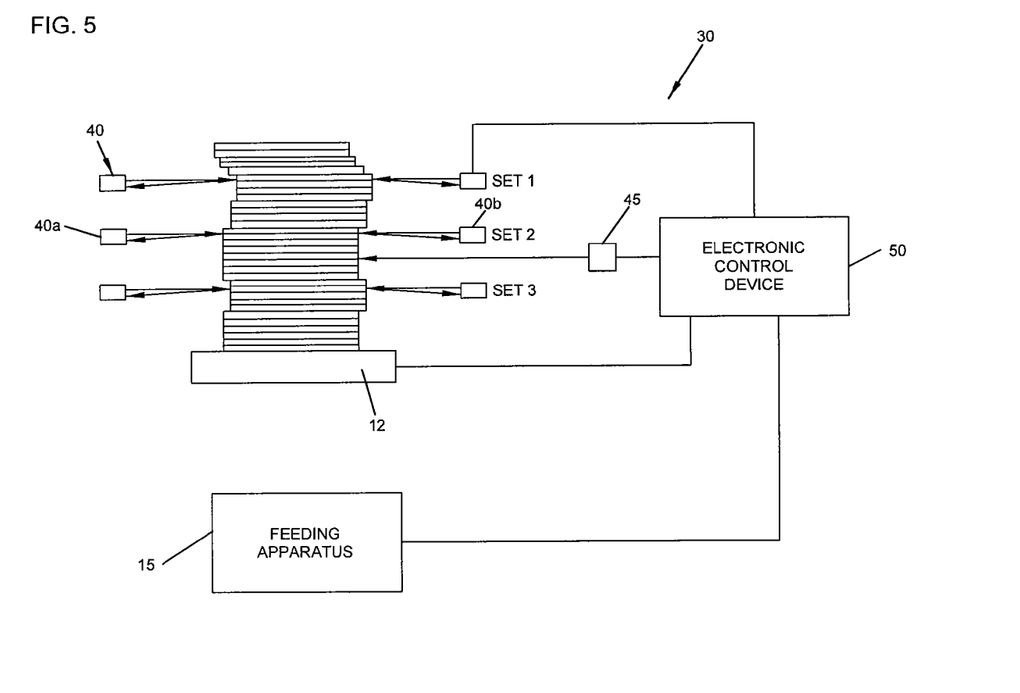
FIG. 5 depicts a schematic of a safety system according to some embodiments.

FIG. 5 depicts a schematic front view of a safety system 30 according to some embodiments. The safety system 30 may include one or more sets of distance measuring sensors 40 and a reading device 45 disposed proximate a conveyor 12 at positions which are upstream of a safety area associated with a feeding apparatus 15, and an electronic control device 50 operatively coupled to the distance measuring sensors 40, the reading device 45, the conveyor 12, and/or the feeding apparatus 15.

In various embodiments, the sensors 40 may be any sensor configured to measure distances to an object using non-contact technology, such as those using optics, sound, or the like, and to deliver an output signal to the electronic control device 50. For example, the sensors 40 may be configured to measure the distance from the sensors 40 to objects disposed upstream of the safety area such as, for example, objects being transported on the conveyor 12 and/or human operators who are approaching the safety area. One example of a suitable distance measuring device 40 for use with the systems and methods described herein is an 01D100 optical distance sensor manufactured by IFM Efector, Inc., of Exton, Pa. Alternatively, the distance measuring sensors 40 may comprise one or more scanning devices, such as laser scanning devices, disposed on opposite sides of the conveyor, which are configured to scan along vertical and/or horizontal axes and measure the distance from the device to the stack at various positions, and output signals to the electronic control device 50.

In some embodiments, the safety system 30 may include one or more sets of sensors 40. A set of sensors 40 may refer to a pair of sensors which are disposed on opposite sides of the conveyor 12, such as the left and right sides of the conveyor 12, at substantially the same vertical height relative to the conveyor 12 (e.g., 40a, 40b). In some embodiments, one or more sets of sensors 40 may be oriented in a column. Generally, a column of sensors 40 may refer to one or more sets of sensors 40 that are disposed in substantially the same vertical plane (i.e., each sensor 40 is at substantially the same position along the conveyor 12), each set of the column being disposed at a different vertical height relative to the conveyor. As can be appreciated with reference to FIG. 5, configuring the sensors 40 in such sets and columns allows for a constant stack thickness to be determined from the distance measurements generated by the sensors 40, despite the sheets of the stack 13 being offset relative to each other. In one embodiment, a first column of sensors 40 is disposed immediately adjacent the safety area, and one or more additional columns of sensors 40 are disposed upstream of the first column of sensors 40.

In various embodiments, the safety system 30 may include a reading device 45 (e.g., bar code scanner, radio frequency identification (RFID) transceiver, and the like) that may be in communication with the control device 50. In this embodiment, any or all of the materials being conveyed on the conveyor 12 may include a code, such as a bar code, RFID tag, or other symbology that is disposed on the materials, which is readable by the reading device 45. The code may include information relating to the materials to which it affixed such as, for example, the actual dimensions of the materials. In embodiments where the materials being conveyed are stacks of sheets, the code may include the actual thickness of the sheets that make up the stack. In embodiments where the stacks of sheets are transported in groups, each stack of a group having substantially the same dimensions, the code may be provided on leading and/or trailing stacks of a group to indicate to the control device 50 that a new group is approaching the safety area. In embodiments where the code is provided on an RFID tag, the RFID tag itself may be capable of communicating information to the control device 50. As an alternative, or in addition to the reading device 45, the safety system 30 may include a photo detector, or other similar device, in communication with the control device 50, which is configured to detect the presence of symbolic elements disposed on the conveyed materials, such as a reflective material. For example, similar to the codes discussed above, the symbolic elements may be provided on leading and/or trailing stacks of a group of stacks, and sensed by a photo detector to indicate to the control device 50 that a new group is approaching the safety area.

In illustrative embodiments, the electronic control device 50 may include a processing device, such as a programmable logic controller (PLC) suitably programmed to, for example, read input signals from any of the sensors 40, reading device 45, the conveyor 12, or the feeding apparatus 15, to process the input signals and then send, in some instances, relevant output signals to any of the conveyor 12 and/or feeding apparatus 15. For example, based on processing of input signals, the electronic control device 50 may send an output signal to either or both of the conveyor 12 and the feeding apparatus 15 which initiates a machine-stopping sequence (hereinafter, an "e-stop signal"). As an example, the control device 50 may include an emergency-stop relay, configured to disable either or both of the conveyor 12 and feeding apparatus 15 in any position in their operation cycles, upon being switched off. As an alternative to, or in addition to a PLC, the electronic control device 50 may comprise an application specific integrated circuit, a general purpose computer, or the like.

In some embodiments, the control device 50 may include a user interface including a suitable input device (e.g., touch screen, buttons, keyboard) and a display device (e.g., monitor), which are operatively coupled to the processing device. In one embodiment, the input device may be configured to allow an operator to activate/deactivate the emergency stop relay, such as by actuating a button of the input device. In this manner, an operator may confirm that undesired objects have left the safety area prior to machinery being reactivated.

Figure 6:
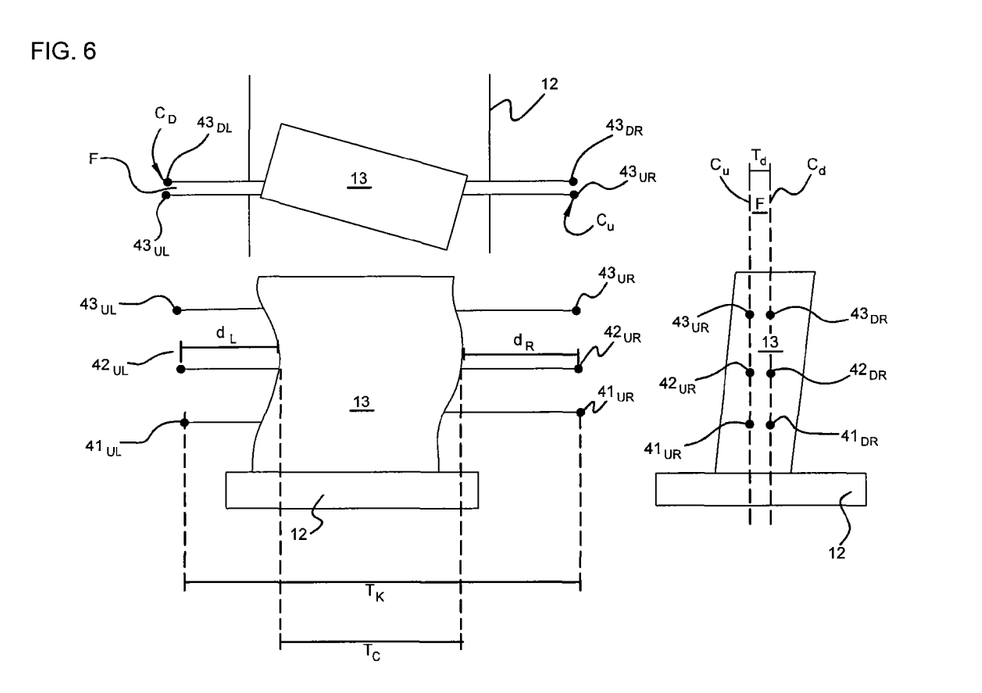
FIG. 6 depicts schematic top, front, and side views of a plurality of sensors oriented with respect to a stack being transported on a conveyor, in accordance with one embodiment.
Figure 7:
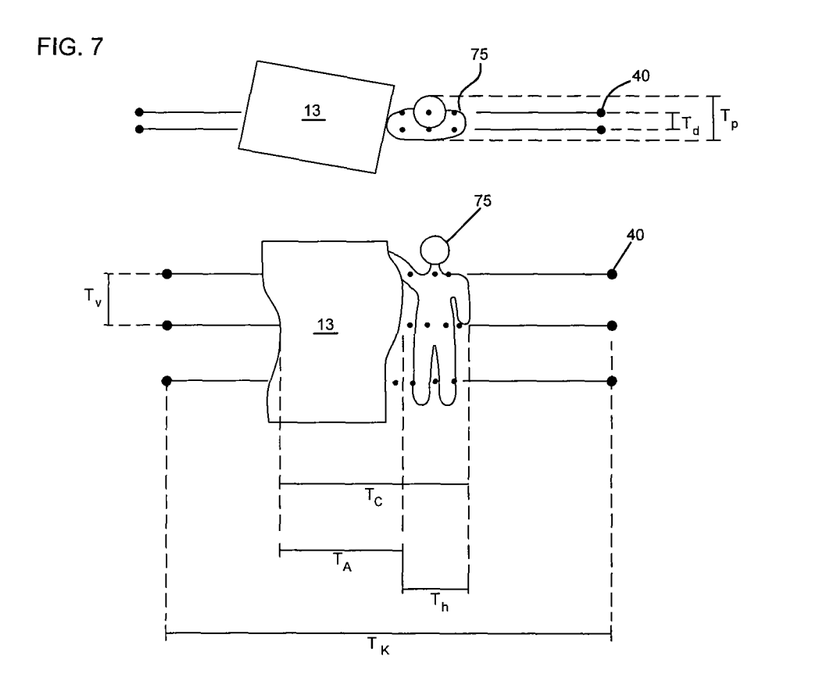
FIG. 7 depicts the schematic top and front views of FIG. 6 with a human operator disposed within the sensor field according to some embodiments

FIG. 6 depicts schematic top, front, and side views of a plurality of sensors 40 oriented with respect to a stack 13 being transported on a conveyor 12, in accordance with some embodiments. FIG. 7 depicts the schematic top and front views of FIG. 6 with a human 75 disposed within the sensor field according to some embodiments. As shown, the system may include six sensors provided on a first side (e.g., left) of the conveyor 12 and six sensors provided on a second side (e.g., right) of the conveyor (i.e., the system may include six sets of sensors). The sensors may be provided in a first column $C_U$ (the upstream column) which is disposed upstream a predetermined distance $T_d$ from a second column $C_D$ (the downstream column). The area between the upstream and downstream columns may be referred to as a sensor field area F. The upstream column may include sensors $43_{UL}$, $42_{UL}$, and $41_{UL}$ disposed on a left side of the conveyor 12 and sensors $43_{UR}$, $42_{UR}$, and $41_{UR}$ disposed on a right side of the conveyor 12. The downstream column may include sensors $43_{DL}$, $42_{DL}$, and $41_{DL}$ disposed on a left side of the conveyor 12 and sensors $43_{DR}$, $42_{DR}$, and $41_{DR}$ disposed on a right side of the conveyor 12. As shown, in some embodiments, each sensor of the columns may have a corresponding sensor of the adjacent column positioned at substantially the same vertical height (e.g., $43_{UR}$ may be at substantially the same vertical height as $43_{DR}$). It is to be appreciated that the number of sets and columns of sensors described with respect to FIG. 6 is not a limitation of the present disclosure, and that safety systems employing any number of sets or columns of sensors are within the scope of the present disclosure. For example, the safety systems may include 3 or more columns of sensors and/or 8 or more sets of sensors. It is to be appreciated that, in embodiments in which the distance measuring sensors 40 include one or more laser scanning devices disposed on opposite sides of the conveyor, the scanning devices may be configured to scan along a path that is defined by, or includes the positions of the sensors discussed with respect to FIGS. 6-7.

In some embodiments, a vertical distance between adjacent sensors $T_v$ (e.g., between $43_{UL}$ and $42_{UL}$) may be determined based on a depth penetration desired when calculating a safe distance between the sensors 40 and the safety area. For example, the vertical distance between adjacent sensors may be determined in accordance with an appropriate industrial safety standard. The horizontal distance between adjacent columns $T_d$, such as the upstream and the downstream columns (e.g., distance between $43_{DR}$ and $43_{UR}$) may be determined as approximately one-half the depth of an average-sized human $T_p$. In this manner, both the upstream and downstream sensors are likely to be blocked upon the occurrence of an operator entering the safety area. Alternatively, the horizontal distance between adjacent columns may be any desired distance.

In some embodiments, the horizontal distance $T_k$ between a set of sensors (e.g., $43_{UL}$ and $43_{UR}$) may be known, and each sensor of a set may be configured to determine a distance (e.g., distances $d_R$ and $d_L$) to an object which is disposed between the sensor set such as, for example, sheets of a stack 13. In this manner, in the absence of an object interposed between the stack 13 and the sensors, a calculated thickness $T_C$ of the stack 13 may be determined by subtracting the sum of the distances determined by a set of sensors from the distance between the sensors. (i.e., $T_C=T_k-(d_R+d_L)$). In systems having a plurality of sets of sensors 40, the calculated thickness $T_C$ may, for example, be determined by averaging the determined thicknesses from the measurements of each of the sets of sensors, taking the maximum or minimum determined thickness, or by any other method known to those skilled in the art. As previously discussed, calculation of a thickness $T_C$ of a stack in this fashion may be unaffected by offsetting (e.g., left/right and front/back) of the sheets of a stack relative to each other.

To facilitate detection of an undesired object in a safety area, in some embodiments, the safety system 30 may compare the actual thickness of a stack (i.e., the thickness of the sheets which make up the stack) with the calculated thickness $T_C$ of the stack. In various embodiments, the actual thickness of the stacks being conveyed through the safety area may be substantially constant for a given period (e.g., the stacks may be transported in groups, each stack of a group having substantially the same dimensions). Such actual thickness may be determined and stored to a data storage of the electronic control device 50 manually, such as by a human operator, or in an automated or semi-automated fashion via programming instructions provided in the electronic control device 50. Regarding manual entry, the actual thickness may be entered via a suitable input device (e.g., touch screen, keyboard) which is operatively coupled to the electronic control device 50 and stored to a data storage of the electronic control device 50.

Regarding semi-automated determination of actual thickness, in one embodiment, the electronic control device 50 may be provided with programming instructions to stop the conveyor 12 when a calculated thickness $T_C$ differs by more than a predetermined tolerance from a previously stored actual thickness. The system may then prompt an operator to confirm the presence of a "new" actual thickness, such as via a suitable input device coupled to the control device 50. Upon confirmation of a "new" actual thickness, the electronic control device 50 may determine the actual thickness based on the signals received from the sensors 40, and store this thickness to a database.

Further regarding semi-automated determination of actual thickness, in embodiments in which a code or other symbolic element is disposed on any or all of the stacks, the presence of a "new" actual thickness (i.e., the existence of a new group of stacks approaching the sensor area) may be detected by the reading device 45, a photo detector, or the like, and communicated to the control device 50. The control device may be provided with programming instructions generate and send a stop signal to the conveyor 12 when a "new" actual thickness is detected. Alternatively, the conveyor 12 may be allowed to continue operation when a "new" actual thickness is detected. In this embodiment, the control device 50 may determine the actual thickness based on, for example, information manually entered by an operator, information read by the reading device 45, and/or information downloaded from an external source.

Regarding automated determination of actual stack thickness, in one embodiment, the electronic control device 50 may be provided with programming instructions to detect a gap between adjacent stacks being transported on the conveyor 12. After detection of a gap, with regard to the next stack to pass through the sensor field, the electronic control device 50 may determine the actual thickness by detecting when the distances measured by the upstream and downstream sensors are substantially the same, and store the corresponding thickness to a database. The electronic control device 50 may be provided with further programming instructions to generate and send a stop signal to the conveyor 12 upon detection of a stack thickness change without a corresponding detected gap. Upon such occurrence, the actual thickness may be determined as described above with respect to semi-automated determination based on a deviation in calculated thickness.

Further regarding automated determination of actual stack thickness, in embodiments in which the actual stack thickness is provided in a code disposed on the stacks, the reading device 45 may read the code and communicate the actual stack thickness to the control device 50 for storage in the database.

FIG. 7 depicts the schematic top and front views of FIG. 6 with a human 75 disposed within the sensor field according to some embodiments. As can be appreciated with reference to FIG. 7, if a human 75 is disposed in the sensor field, a calculated thickness $T_C$ determined based on the sensor measurements will be greater than the actual thickness $T_A$ of the stack 13. As will be discussed in further detail below, if the calculated thickness $T_C$ is greater than the actual thickness $T_A$, the system 30 may assume that an operator or any other undesirable item has entered the safety area, and thus cease operation of the conveyor 12 and/or feeding apparatus 15.

Figure 8:
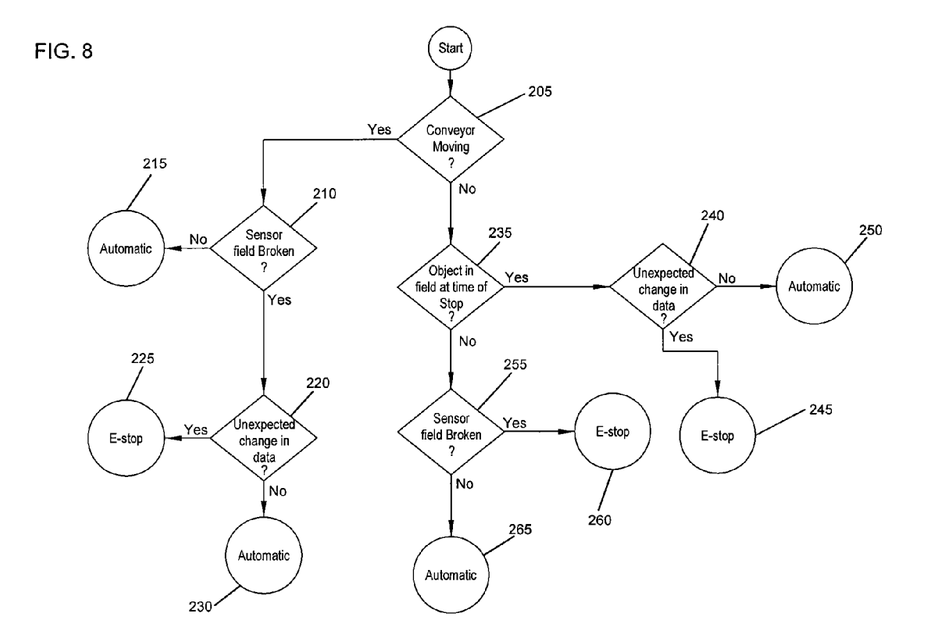
FIG. 8 depicts a process-flow diagram for operation of a safety system in accordance with some embodiments

FIG. 8 depicts a process-flow diagram for operation of the safety system 30 in accordance with some embodiments. Initially, the system 30 may query whether the conveyor is moving (step 205). If it is determined that the conveyor is moving, the system 30 may query whether the sensor field is broken (step 210). For example, the system 30 may query whether the distances measured by each of a pair of sensors 40 is less than distance between the pair of sensors 40.

If it is determined that the sensor field is not broken, the system 30 may allow operation to continue (i.e., operation of the conveyor 12 and the feeding apparatus 15 will continue) (step 215). If it is determined that the sensor field is broken, the system 30 may query whether there is an unexpected change in calculated thickness of an object passing through the sensor field (step 220). For example, the system may query whether the calculated thickness of a stack passing through the sensor field is greater than an actual stack thickness (plus predetermined tolerances) which was previously stored. In theory, if the calculated thickness of a stack is greater than the actual thickness, it is assumed that an operator or other undesired object has entered the safety area. Thus, if it is determined that there has been an unexpected change in calculated thickness, the system 30 may generate an emergency stop signal (step 225), which may be communicated to either or both of the conveyor 12 and the feeding apparatus 15. If it is determined that there is not an unexpected change in calculated thickness, the system 30 may allow operation to continue (step 230).

If at the query of step 205, it is determined that conveyor is not moving, the system 30 may query whether there was an object in the sensor field at the time of the most recent conveyor stoppage (step 235). For example, the system 30 may query whether the distances measured by any of the sensors 40 at such time was less than a predetermined distance such as, for example, the horizontal distance between a sensor pair.

If it is determined that there was an object in the sensor field, the system 30 may query whether there is an unexpected change in calculated thickness (step 240). If it is determined that there is an unexpected change in calculated thickness, the system 30 may generate an emergency stop signal (step 245). If it is determined that there is not an unexpected change in calculated thickness, the system 30 may allow operation to continue (step 250).

If at the query of step 235 it is determined that there was not an object in the sensor field at the time of the most recent conveyor stoppage, the system 30 may query whether the sensor field is broken (step 255). In theory, if the sensor field is broken during a conveyor stoppage and there was not an object in the sensor field at the time of the stoppage, it is assumed that an operator or other undesired object has entered the safety area. Thus, if it is determined that the sensor field is broken, the system 30 may generate an emergency stop signal (step 260). If it is determined that the sensor field is not broken, the system 30 may allow operation to continue (step 265).

It is to be appreciated that the process-flow of FIG. 8 is illustrative only, and that those skilled in the art would recognize that alternative process-flows may be employed without deviating from the scope of the present disclosure.

Figure 9:
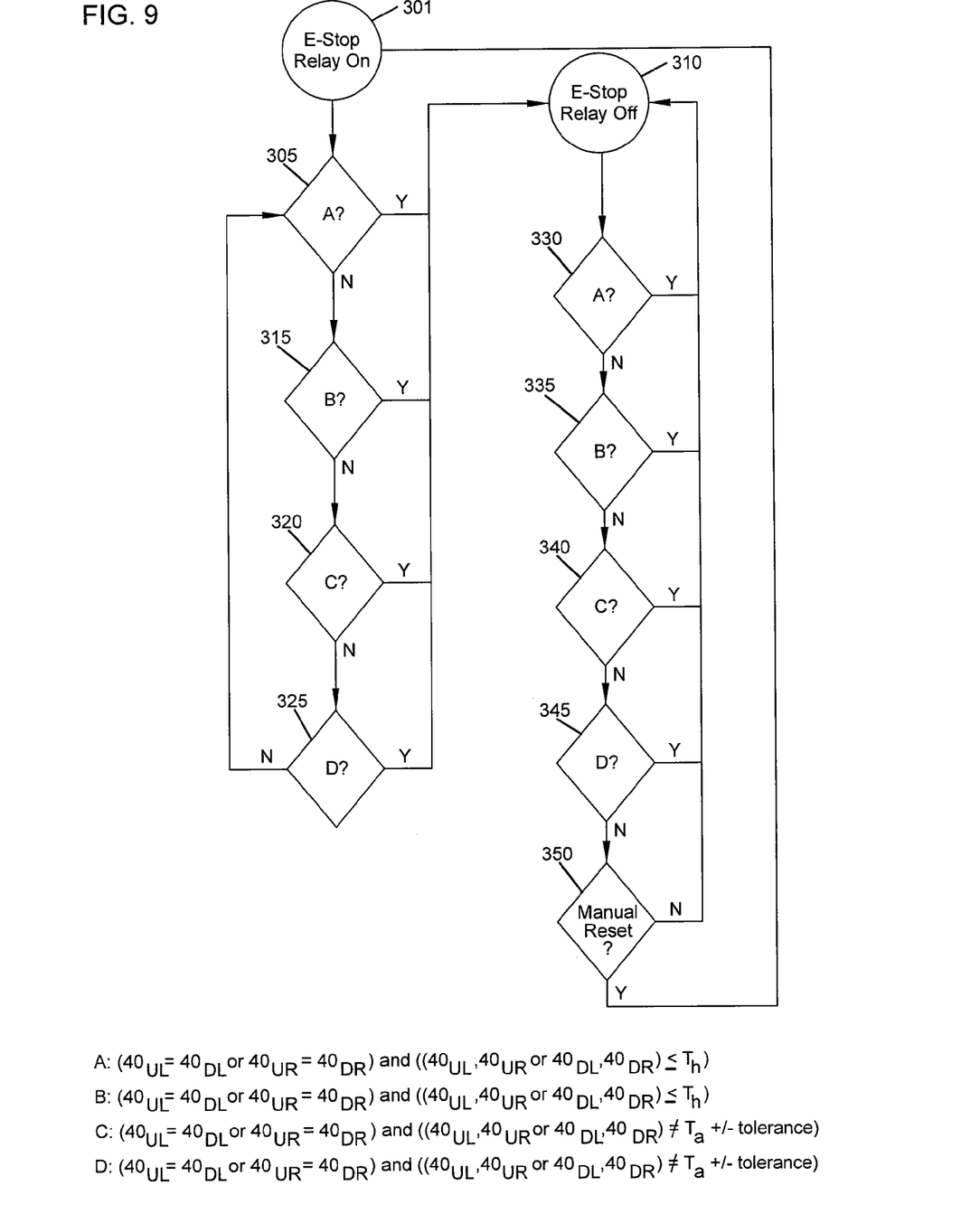
FIG. 9 depicts a control logic process flow for reducing the occurrence of false-positives in accordance with one embodiment.
Figures 10A, 10B, 11A, 11B:
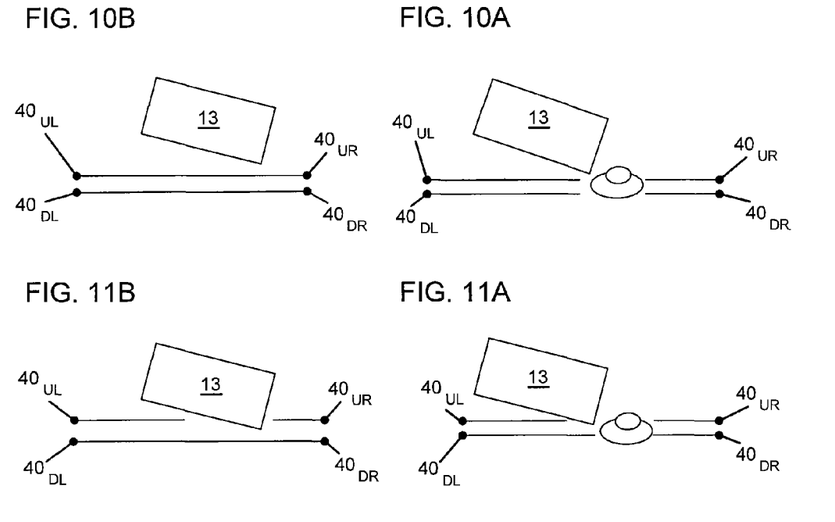
FIG. 10a-10b depict schematic top views of a stack positioned relative to a sensor field, with and without an operator in the sensor field, respectively, and with neither of the individual sensor fields formed by the upstream and downstream pairs of sensors obstructed by a stack.
FIGS. 11a and 11b depict schematic top views of a stack positioned relative to a sensor field, with and without an operator in the sensor field, respectively, and with the individual sensor field formed by the upstream pair of sensors partially obstructed by the stack.
Figure 12A:
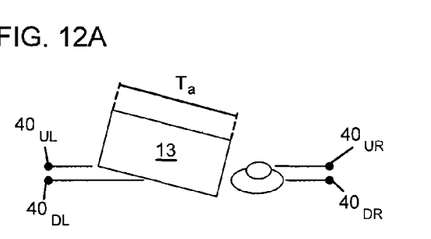
FIGS. 12a and 12b depict schematic top views of a stack positioned relative to a sensor field, with and without an operator in the sensor field, respectively, and with the individual sensor field formed by the upstream pair of sensors fully obstructed by the stack and the individual sensor field formed by the downstream pair of sensors partially obstructed by the stack.
Figure 12B:
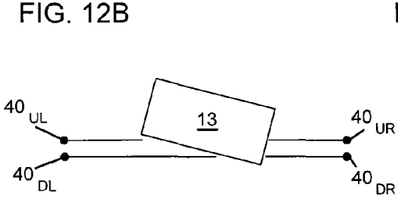
Figure 13A:
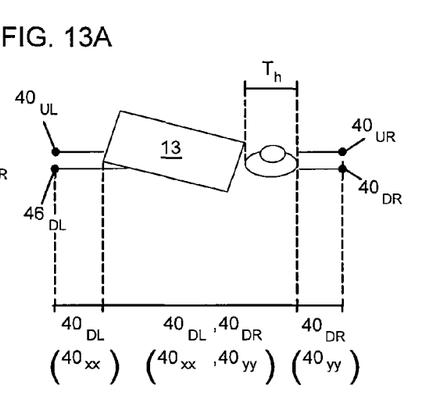
FIGS. 13a and 13b depict schematic top views of a stack positioned relative to a sensor field, with and without an operator in the sensor field, respectively, and with both individual sensor fields formed by the upstream and downstream sensors fully obstructed by the stack.
Figure 13B:
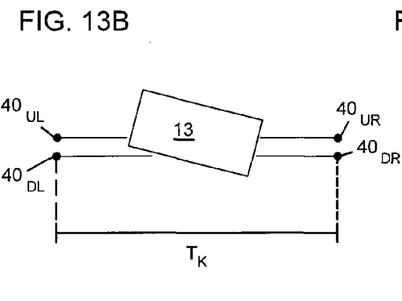

In some embodiments, the electronic control device 50 may be provided with further programming instructions for reliably determining whether a change in calculated thickness of a stack is a result of an undesired object entering the safety area as opposed to a stack being rotationally offset relative to the conveying direction of the conveyor. Such capability may substantially eliminate the occurrence of "false-positives" attributable to the rotational orientation of the stacks. (i.e., generation of a emergency stop signal by the electronic control device 50 when there are no undesired objects in the safety area). FIG. 9 depicts a control logic process flow for reducing the occurrence of false-positives in accordance with one embodiment. FIGS. 10-13 depict schematic top views of stacks which are rotationally offset, which are provided to aid the discussion of the logic steps of FIG. 9. FIGS. 10*a* and 10*b* depict schematic top views of a stack positioned relative to a sensor field, with and without an operator in the sensor field, respectively, and with neither of the individual sensor fields formed by the upstream and downstream pairs of sensors obstructed by the stack 13. FIGS. 11*a* and 11*b* depict schematic top views of a stack positioned relative to a sensor field, with and without an operator in the sensor field, respectively, and with the individual sensor field formed by the upstream pair of sensors partially obstructed (i.e., the sensor field passes only partially through the thickness of the stack) by the stack 13. FIGS. 12a and 12b depict schematic top views of a stack positioned relative to a sensor field, with and without an operator in the sensor field, respectively, and with the individual sensor field formed by the upstream pair of sensors fully obstructed (i.e., the sensor field passes through the entire thickness of the stack) by the stack 13 and the individual sensor field formed by the downstream pair of sensors partially obstructed by the stack 13. FIGS. 13a and 13b depict schematic top views of a stack positioned relative to a sensor field, with and without an operator in the sensor field, respectively, and with both individual sensor fields formed by the upstream and downstream sensors fully obstructed by the stack 13.

As shown in FIGS. 6 and 10-13, stacks 13 may be transported through a sensor field defined by a first column $C_U$ which comprises a sensor pair $40_{UL}$ and $40_{DR}$, and a second column $C_D$, which is disposed downstream of the column $C_U$, and comprises a sensor pair $40_{DL}$ and $40_{DR}$. It is to be appreciated that either or both of the columns $C_U$ and $C_D$ may be comprised of additional sensor pairs. In the discussion of FIGS. 9-13 which follows, the following conventions are employed: $(40_{xx})$ is the measured distance from sensor $40_{xx}$ to the nearest object to sensor $40_{xx}$ in the sensor field, $(40_{xx}, 40_{yy})$ is the thickness of the object(s) in the sensor field as determined from the distance measurements generated by sensors $40_{xx}$ and $40_{yy}$, $T_h$ is a predetermined value which is approximately the width of a human (e.g., distance from shoulder to shoulder), $T_k$ is the known horizontal distance between sensors of a sensor pair (e.g., distance between $40_{UL}$ and $40_{UR}$), and $T_a$ is the actual thickness of the stack 13.

Referring again to FIG. 9, initially, an emergency-stop relay may be switched on (step 301) which enables the system to start. The process may then query if $(40_{UL}=40_{DL}$ or $40_{UR}=40_{DR})$ and $((40_{UL},40_{UR}$ or $40_{DL},40_{DR})\leq T_h)$ (step 305) (FIG. 10a depicts an exemplary situation in which the query of step 305 is satisfied; FIG. 10b depicts an exemplary situation in which the query of step 305 is not satisfied).

If the query of step 305 is satisfied, an emergency stop signal may be generated (step 310), which may, for example, switch off the emergency-stop relay, thereby disabling the system.

If the query of step 305 is not satisfied, the process may query if $(40_{UL}=40_{DL}$ or $40_{UR}=40_{DR})$ and $((40_{UL},40_{UR}$ or $40_{DL},40_{DR})\leq T_h)$ (step 315) (FIG. 11a depicts an exemplary situation in which the query of step 315 is satisfied; FIG. 11b depicts an exemplary situation in which the query of step 315 is not satisfied).

If the query of step 315 is satisfied, an emergency stop signal may be generated (step 310).

If the query of step 315 is not satisfied, the process may query if $(40_{UL}=40_{DL}$ or $40_{UR}=40_{DR})$ and $((40_{UL},40_{UR}$ or $40_{DL},40_{DR})\neq T_a +/-$tolerance) (step 320) (FIG. 12a depicts an exemplary situation in which the query of step 320 is satisfied; FIG. 12b depicts an exemplary situation in which the query of step 320 is not satisfied).

If the query of step 320 is satisfied, an emergency stop signal may be generated (step 310).

If the query of step 320 is not satisfied, the process may query if $(40_{UL}=40_{DL}$ or $40_{UR}=40_{DR})$ and $((40_{UL},40_{UR}$ or $40_{DL},40_{DR})\neq T_a +/-$tolerance) (step 325) (FIG. 13a depicts an exemplary situation in which the query of step 325 is satisfied).

If the query of step 325 is satisfied, an emergency stop signal may be generated (step 310). If the query of step 325 is not satisfied, the process may return to the query of step 305.

Still referring to FIG. 9, in some embodiments, if an emergency stop signal (step 310) is generated, the process may query if $(40_{UL}=40_{DL}$ or $40_{UR}=40_{DR})$ and $((40_{UL},40_{UR}$ or $40_{DL},40_{DR})\leq T_h)$ (step 330) (FIG. 10b depicts an exemplary situation in which the query of step 330 is not satisfied).

If the query of step 330 is satisfied, the process may return to step 310 (i.e., the emergency-stop relay remains off).

If the query of step 330 is not satisfied, the process may query if $(40_{UL}=40_{DL}$ or $40_{UR}=40_{DR})$ and $((40_{UL},40_{UR}$ or $40_{DL},40_{DR})\leq T_h)$ (step 335) (FIG. 11b depicts an exemplary situation in which the query of step 335 is not satisfied).

If the query of step 335 is satisfied, the process may return to step 310.

If the query of step 335 is not satisfied, the process may query if $(40_{UL}=40_{DL}$ or $40_{UR}=40_{DR})$ and $((40_{UL},40_{UR}$ or $40_{DL},40_{DR})\neq T_a +/-$tolerance) (step 340) (FIG. 12b depicts an exemplary situation in which the query of step 340 is not satisfied).

If the query of step 340 is satisfied, the process may return to step 310.

If the query of step 340 is not satisfied, the process may query if $(40_{UL}=40_{DL}$ or $40_{UR}=40_{DR})$ and $((40_{UL},40_{UR}$ or $40_{DL},40_{DR})\neq T_a +/-$tolerance) (step 345) (FIG. 13b depicts an exemplary situation in which the query of step 345 is not satisfied).

If the query of step 345 is satisfied, the process may return to step 310.

If the query of step 345 is not satisfied, the process may query whether a manual reset button associated with an input device of the control device 50 has been actuated (step 350). For example, if the query of step 345 is not satisfied, an operator may be prompted to confirm that the safety area is clear of undesired objects, such as by actuating the reset button.

If the query of step 350 is satisfied, the emergency-stop relay may be switched on (step 301), thereby enabling the system to restart. If the query of step 350 is not satisfied, the process may return to step 310.

Alternatively, if the query of step 345 is not satisfied, the emergency-stop relay may be switched on (step 301) (i.e., the query of step 350 may be bypassed and the system may be enabled to restart without confirmation from an operator).

It is to be appreciated that the control logic of FIG. 9 is illustrative only, and that those skilled in the art would recognize that alternative control logic may be employed without deviating from the scope of the present disclosure.

While the foregoing has been described with respect to embodiments in which materials are being conveyed along a conveying path unidirectionally with respect to a safety area, those skilled in the art will appreciate that the systems and methods discussed herein may be readily modifiable to detect the presence of undesired objects in situations in which materials are conveyed bidirectionally with respect to a safety area.

The systems and methods disclosed herein may provide safe and reliable means to distinguish between materials and human operators, or other undesired objects, entering a safety area. It is to be appreciated that the systems and methods can be employed as a retrofit for existing industrial safety systems or employed as a new system.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

What is claimed is:

1. A safety system for detecting the presence of an undesired object in a safety area having a conveyor for conveying materials defining a conveying path extending through said safety area system comprising:
   a first pair of distance measuring sensors disposed on opposed sides of the conveying path, the first pair of distance measuring sensors defining a first sensor field between said first pair of distance measuring sensors;
   a second pair of distance measuring sensors disposed on opposed sides of the conveying path, the second pair of distance measuring sensors defining a second sensor field between said second pair of distance measuring sensors;
   an electronic control device operatively coupled to the sensors;
   wherein the distance measuring sensors are configured to transmit signals related to measured distances to the electronic control device; and
   wherein the electronic control device is provided with programming instructions for determining a horizontal dimension of objects disposed in the first sensor field and the second sensor field along a substantially horizontal direction that is non-parallel to the conveying path based at least in part on the signals related to measured distances, and configured to initiate a conveyor-stopping sequence based at least in part on the determined horizontal dimension of the objects;
   wherein the electronic control device is configured to compare a first measured distance defined by said first sensor field and a second measured distance defined by said second sensor field and said conveyer-stopping sequence is responsive to the presence of the undesired object in at least one of: said first sensor field, said second sensor field;
   wherein the presence of the undesired object in at least one of said first sensor field and said second field is determined when a distinction between said first measured distance and said second measured distance is sufficient based on the comparison.

2. The safety system of claim 1, wherein the second pair of distance measuring sensors is provided at a location along the conveying path which is downstream a predetermined distance relative to the first pair of distance measuring sensors.

3. The safety system of claim 1, further comprising a first column of distance measuring sensors including two or more pairs of distance measuring sensors disposed on opposed sides of the conveying path, each pair of the first column being disposed at a different vertical height relative to the conveying path and lying in substantially the same vertical plane.

4. The safety system of claim 3, wherein said second sensor field includes a second column of distance measuring sensors including two or more pairs of distance measuring sensors disposed on opposed sides of the conveying path, each pair of the second column being disposed at a different vertical height relative to the conveying path and lying in substantially the same vertical plane.

5. The safety system of claim 4, wherein the first column is provided at a location along the conveying path which is downstream a predetermined distance relative to the second column.

6. The safety system of claim 5, wherein each of the first and second columns comprise three pairs of distance measuring sensors.

7. The safety system of claim 1, wherein the electronic control device comprises a data storage having an actual material dimension stored thereon corresponding to an actual dimension of the materials being conveyed, and wherein the electronic control device is provided with programming instructions for initiating the conveyor-stopping sequence based at least in part on a comparison of the determined horizontal dimension of the objects and the actual material dimension.

8. The safety system of claim 7, wherein the electronic control device is provided with programming instructions for initiating the conveyor-stopping sequence if the determined horizontal dimension of the objects is greater than the actual material dimension by an amount more than a predetermined threshold.

9. The safety system of claim 8, further comprising a reading device disposed proximate the conveying path and operatively coupled to the electronic control device, wherein the materials have a code disposed thereon that includes the actual material dimension of the materials, and wherein the reading device is configured to read the code and communicate the actual material dimension to the electronic control device.

10. The safety system of claim 1, wherein the electronic control device comprises a programmable logic control.

11. A safety system for detecting the presence of an undesired object in a safety area proximate an entrance to a feeding apparatus, the safety area having a conveyor extending through said safety area for conveying stacks of sheets of stock material along a conveyor path into the feeding apparatus, the system comprising:
   a first pair of distance measuring sensors disposed on opposed sides of the conveyor, the first pair of distance measuring sensors configured to measure distance in a direction substantially perpendicular to the conveying path and defining a first sensor field between said first pair of distance measuring sensors;
   a second pair of distance measuring sensors disposed on opposed sides of the conveyor, the second pair of distance measuring sensors configured to measure distance in a direction substantially perpendicular to the conveying path and defining a second sensor field between said second pair of distance measuring sensors;
   an electronic control device operatively coupled to distance measuring sensors, and to the conveyor or the feeding apparatus;
   wherein the electronic control device is configured to receive signals related to measured distances from the distance measuring sensors and transmit the signals related to measured distances to the conveyor or to the feeding apparatus
   wherein the distance measuring sensors are configured to transmit the signals related to measured distances to the electronic control device; and
   wherein the electronic control device is provided with programming instructions for determining a horizontal dimension of objects disposed in the first sensor field and the second sensor field along a substantially horizontal direction that is non-parallel to the conveyor path based at least in part on the signals related to measured distances, and for determining whether an emergency-stop signal is sent to the conveyor or to the feeding apparatus based on the determined horizontal dimension of the objects;

wherein the electronic control device is configured to compare a first measured distance defined by said first sensor field and a second measured distance defined by said second sensor field, and said emergency-stop signal is also sent in response to the presence of the undesired object in at least one of: said first sensor field, said second sensor field;

wherein the presence of the undesired object in at least one of said first sensor field and said second sensor field is determined when a distinction between said first measured distance and said second measured distance is sufficient based on the comparison.

12. The safety system of claim 11, further comprising a second pair of distance measuring sensors disposed on opposed sides of the conveyor, wherein the second pair of distance measuring sensors is provided at a location along the conveyor which is downstream a predetermined distance relative to the first pair of distance measuring sensors.

13. The safety system of claim 11, further comprising a first column of distance measuring sensors including two or more pairs of distance measuring sensors disposed on opposed sides of the conveyor, each pair of the first column being disposed at a different vertical height relative to the conveyor and lying in substantially the same vertical plane.

14. The safety of claim 13, further comprising a second column of distance measuring sensors including two or more pairs of distance measuring sensors disposed on opposed sides of the conveyor, each pair of the second column being disposed at a different vertical height relative to the conveyor and lying in substantially the same vertical plane.

15. The safety system of claim 14, wherein the first column is provided at a location along the conveyor which is downstream a predetermined distance relative to the second column.

16. The safety system of claim 15, wherein each of the first and second columns comprise three pairs of distance measuring sensors.

17. The safety system of claim 11, wherein the electronic control device comprises a data storage having an actual stack dimension stored thereon corresponding to the actual dimension of the stacks of sheets being conveyed, and wherein the determination of whether the emergency-stop signal is sent to the conveyor or the feeding apparatus is further based at least in part on a comparison of the determined horizontal dimension of the objects and the actual material dimension.

18. The safety system of claim 17, wherein the electronic control device is provided with programming instructions for transmitting the emergency-stop signal to the conveyor or to the feeding apparatus if the determined horizontal dimension of the objects is greater than the actual material dimension by an amount more than a predetermined threshold.

19. The safety system of claim 11, wherein the electronic control device comprises a programmable logic control.

20. The safety system of claim 1, wherein the horizontal dimension of objects disposed in the sensor field is determined along a direction that is substantially perpendicular to the conveying path.

* * * * *

UNITED STATES PATENT AND TRADEMARK OFFICE
CERTIFICATE OF CORRECTION

| | |
|---|---|
| PATENT NO. | : 8,446,247 B2 |
| APPLICATION NO. | : 12/603351 |
| DATED | : May 21, 2013 |
| INVENTOR(S) | : Robert M. Allen et al. |

It is certified that error appears in the above-identified patent and that said Letters Patent is hereby corrected as shown below:

SPECIFICATION

| Column | Line | PTO | Should Read |
|---|---|---|---|
| 9 | 21 | "$40_{UL}$ and $40_{DR}$, and a second" | --$40_{UL}$ and $40_{UR}$, and a second-- |
| 9 | 28 | "sensor field, $(40_{xx}40_{yy})$" | --sensor field, $(40_{xx}, 40_{yy})$-- |

CLAIMS

| Column | Line | PTO | Should Read |
|---|---|---|---|
| 11 | 11 | "safety area system comprising:" | --safety area, the system comprising:-- |
| 11 | 43 | "said second field is" | --said second sensor field is-- |

Signed and Sealed this
Twenty-fourth Day of September, 2013

Teresa Stanek Rea
*Deputy Director of the United States Patent and Trademark Office*